V. BLACK.
Device for Handling Hogsheads of Tobacco.
No. 201,220. Patented March 12, 1878.
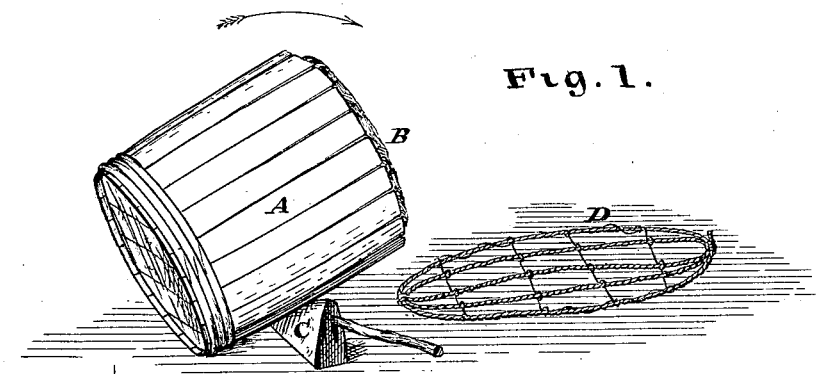
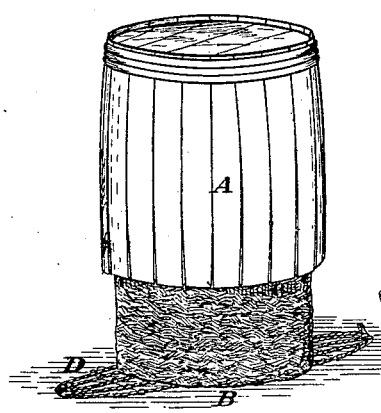
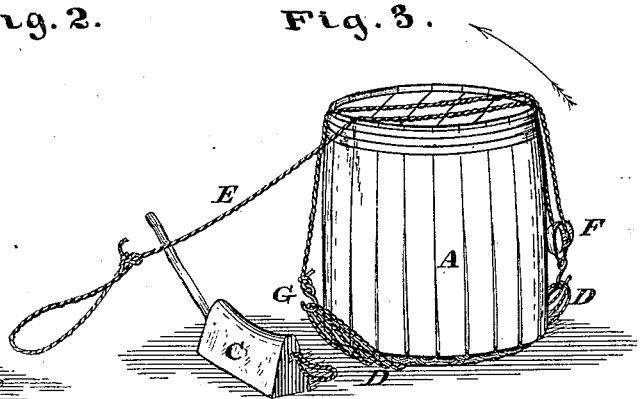
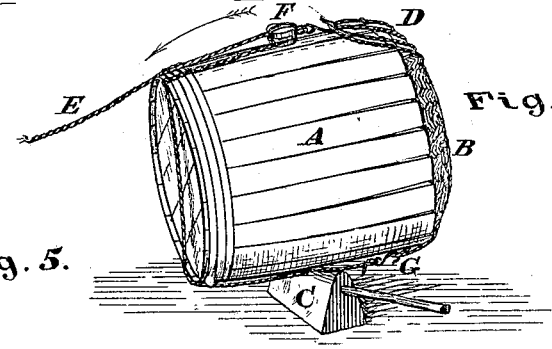
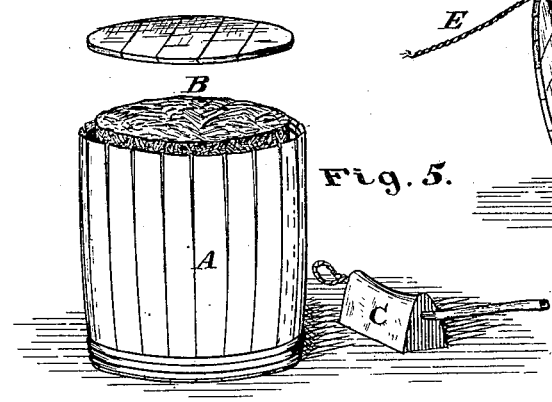
Attest:
Walter Knight.
Percy Knight.
Inventor
Villie Black
By Knight Bros.
Attys.

UNITED STATES PATENT OFFICE.

VILLIE BLACK, OF CINCINNATI, OHIO, ASSIGNOR OF ONE-HALF HIS RIGHT TO JOHN A. CRAWFORD, OF COVINGTON, KENTUCKY.

IMPROVEMENT IN DEVICES FOR HANDLING HOGSHEADS OF TOBACCO.

Specification forming part of Letters Patent No. 201,220, dated March 12, 1878; application filed February 6, 1878.

*To all whom it may concern:*

Be it known that I, VILLIE BLACK, of Cincinnati, Hamilton county, Ohio, have invented a new and useful Device for Handling Tobacco in Opened Hogsheads, of which the following is a specification:

In offering for sale tobacco in hogsheads, it is customary to remove the hoops and the head from one end of the cask, and then to invert the latter and lift the cask from off the "cheese" or mass of tobacco, which, having been examined, (sampled,) is again covered by the cask, and the latter, with its contents, is then reinverted, so as to present its open end uppermost, for the convenience of reheading. In effecting this second inversion much tobacco (especially if its condition be a dry one) is scattered and wasted upon the floor, and other portions soiled and deteriorated in value, and, in addition to this spoliation and loss of time, space and labor are expended, which are saved by my device, and which I now proceed to describe, reference being had to the accompanying drawings, making part of this specification.

Figure 1 represents an open-ended hogshead about to be dumped upon my guard or net. Fig. 2 shows the cheese deposited on the net and the cask being lifted off. Fig. 3 shows the cask restored to the cheese and my tackle engaged in the net. Fig. 4 represents the hogshead undergoing reinversion by means of the net, tackle, and tipping-block. Fig. 5 shows the hogshead reinverted and in condition for the customary re-pressing, heading, and hooping.

A may represent an ordinary tobacco-hogshead, and B its customary compacted contents or cheese. C represents a tipping-block. D represents my net or guard, made of three-quarter-inch rope, which is retained in the represented open ellipse form by cross-wires. In practice I prefer to use but one piece of rope and one wire, as herein shown. Finally, a cord, E, rove through a common hooked pulley, F, and terminating in a hook, G, constitutes an operative tackle, whereby, in conjunction with the net and tipping-block, the operation of reinversion is easily, economically, and quickly performed.

My device is operated as follows: A net, D, having been deposited upon the floor, one end toward the opened hogshead, and the block C conveniently placed, the cask is inverted, so as to bring the cheese fair upon the net, and the cask is then lifted off in the usual way, as indicated in Fig. 2.

After sampling the tobacco the cask is again placed over the tobacco, and the tackle E F G engaged in the two projecting ends of the net, so as to protect the contents. The tackle being now drawn taut, the hogshead is easily and quickly capsized and reinverted, as shown in Figs. 4 and 5, the net, at the same time, effectually retaining the contents and preventing their spillage and loss.

Inasmuch as many hogsheads are sampled as often as ten times before final disposal, and as under the ordinary process each sampling is accompanied by more or less loss and deterioration of tobacco, the utility of my device is sufficiently apparent.

I claim as new and of my invention—

1. The several devices herein described and shown, jointly, for manipulating hogsheads of tobacco.

2. The mode of inverting a hogshead of tobacco, removing the hogshead from the tobacco, replacing it upon the tobacco, and reinverting it, herein described.

In testimony of which invention I hereunto set my hand.

VILLIE BLACK.

Attest:
 GEO. H. KNIGHT,
 L. H. BOND.